(12) United States Patent
Ricciardo

(10) Patent No.: US 7,922,433 B2
(45) Date of Patent: Apr. 12, 2011

(54) LOCKING FASTENING APPARATUS

(75) Inventor: Mark J. Ricciardo, Jupiter, FL (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 394 days.

(21) Appl. No.: 11/762,923

(22) Filed: Jun. 14, 2007

(65) Prior Publication Data
US 2008/0310933 A1 Dec. 18, 2008

(51) Int. Cl.
*F16B 39/10* (2006.01)
(52) U.S. Cl. ........ 411/119; 411/161; 411/166; 411/178; 411/389
(58) Field of Classification Search .................. 411/161, 411/178, 190, 389, 107–109, 119–122, 166
See application file for complete search history.

(56) References Cited

U.S. PATENT DOCUMENTS

| | | | | |
|---|---|---|---|---|
| 1,643,034 A | * | 9/1927 | Sirl | 280/93.512 |
| 2,400,318 A | * | 5/1946 | Rosan | 411/373 |
| 2,407,904 A | | 9/1946 | Rosan | |
| 2,525,217 A | * | 10/1950 | Glitsch | 292/256.73 |
| 2,537,527 A | | 1/1951 | Heckert | |
| 2,577,810 A | * | 12/1951 | Rosan | 411/109 |
| 3,168,915 A | | 2/1965 | Frank | 411/271 |
| 3,227,031 A | * | 1/1966 | Williams | 411/26 |
| 3,244,055 A | * | 4/1966 | Schuermann et al. | 411/378 |
| 3,312,139 A | * | 4/1967 | Di Cristina | 411/54 |
| 3,351,116 A | * | 11/1967 | Madsen | 411/102 |
| 3,408,887 A | * | 11/1968 | Villo | 83/140 |
| 3,455,198 A | * | 7/1969 | Barrett | 411/388 |
| 4,007,659 A | | 2/1977 | Stencel | |
| 4,043,239 A | * | 8/1977 | DeFusco | 411/337 |
| 4,050,494 A | | 9/1977 | deClaire | |
| 4,157,674 A | * | 6/1979 | Carlson et al. | 411/389 |
| 4,730,967 A | | 3/1988 | Warkentin | |
| 4,770,584 A | * | 9/1988 | Vinciguerra | 411/389 |
| 4,787,790 A | * | 11/1988 | Shirai | 411/109 |
| 4,927,187 A | | 5/1990 | Sanford et al. | |

(Continued)

FOREIGN PATENT DOCUMENTS

DE 8308064 8/1988

(Continued)

OTHER PUBLICATIONS

European Search Report dated Jun. 8, 2008.

*Primary Examiner* — Shane Bomar
*Assistant Examiner* — Roberta Delisle
(74) *Attorney, Agent, or Firm* — Carlson Gaskey & Olds PC

(57) ABSTRACT

In some embodiments fastening apparatus includes a threaded fastening element adapted to be threaded into a hole provided in a first component, the threaded fastening element including a locking collar that is defined by at least one outer peripheral surface, and a locking washer adapted to fit within a recess formed in the component to limit rotation of the threaded fastening element once the element is threaded into the component hole, the washer including an inner opening defined by at least one inner peripheral surface and a non-circular outer shape defined by an outer peripheral surface, the inner opening being adapted to receive the locking collar such that the at least one outer peripheral surface of the collar can contact the at least one inner peripheral surface of the washer.

18 Claims, 4 Drawing Sheets

U.S. PATENT DOCUMENTS

| | | | |
|---|---|---|---|
| 4,938,644 A * | 7/1990 | Runels | 411/132 |
| 5,232,323 A * | 8/1993 | Baehre | 411/178 |
| 5,315,755 A | 5/1994 | Fulbright et al. | |
| 5,324,151 A | 6/1994 | Szudarek et al. | |
| 5,358,367 A * | 10/1994 | Yang | 411/397 |
| 6,042,315 A | 3/2000 | Miller et al. | |
| 6,254,141 B1 * | 7/2001 | Piper | 285/56 |
| 6,350,093 B1 * | 2/2002 | Petersen et al. | 411/82.1 |
| 6,588,303 B1 | 7/2003 | Walsh | |
| 6,773,215 B2 | 8/2004 | Cuva et al. | |
| 6,884,025 B2 | 4/2005 | Pickens et al. | |
| 6,976,816 B2 * | 12/2005 | Slesinski et al. | 411/122 |
| 2001/0022926 A1 * | 9/2001 | Kitayama et al. | 411/531 |
| 2003/0118399 A1 | 6/2003 | Schilling et al. | |
| 2006/0078402 A1 * | 4/2006 | Barnsdale | 411/178 |

FOREIGN PATENT DOCUMENTS

| | | |
|---|---|---|
| GB | 2237615 | 5/1991 |

* cited by examiner

LOCKING FASTENING APPARATUS

BACKGROUND

1. Field of the Invention

The present disclosure generally relates to fastening apparatus. More particularly, the present disclosure relates to locking fastening apparatus including locking features that prevent a threaded fastening element from rotating once the threaded fastening element has been used to secure components together.

2. Description of the Related Art

Threaded fastening elements, such as threaded bolts or studs, are often used to connect components together. It is important in some applications to ensure that the threaded fastening element does not rotate once placed in position within one of the components. In such applications, locking apparatus is used that, when functioning properly, does not permit a threaded fastening element to rotate relative to a threaded hole in which it is received.

Currently, many fastening apparatuses use keys that are intended to prevent rotation of a threaded fastening element. In some cases, a longitudinal slot is formed in a threaded fastening element and in the threaded hole of a component in which the fastening element is to be received. When the fastening element is threaded into the threaded hole, the slot formed in the fastening element is aligned with the slot formed in the hole and a key is driven into the aligned slots with an interference fit. Typically, a key comprises a strip of metal with a square or trapezoidal shaped cross-section. Once the key is driven into the aligned slots, the fastening element can no longer rotate relative to the threaded hole.

The use of such keys can be disadvantageous. For example, if the fastening element is a threaded stud having exposed threads that become stripped or otherwise damaged, the stud cannot be easily removed from its associated component due to the presence of the key. In such a case, it may be necessary to cut the exposed portion of the stud and drill out the portion of the stud that is within the component. Such an action can be expensive to perform and introduces the risk of damage or destruction to the component threads, which may render the component unusable.

Furthermore, keys can shear and "liberate" from the threaded opening in the component. Such liberation may create a hazard when the part is disassembled by becoming a foreign object with other hardware. Moreover, keys can fail when the fastening element is over-torqued, thereby enabling rotation of the fastening element that can result in damage to the threads of the component into which the fastening element is threaded, which also may render the component unusable.

SUMMARY

In one embodiment, the present disclosure relates to fastening apparatus comprising a threaded fastening element adapted to be threaded into a hole provided in a first component, the threaded fastening element including a locking collar that is defined by at least one outer peripheral surface, and a locking washer adapted to fit within a recess formed in the component to limit rotation of the threaded fastening element once the element is threaded into the component hole, the washer including an inner opening defined by at least one inner peripheral surface and a non-circular outer shape defined by an outer peripheral surface, the inner opening being adapted to receive the locking collar such that the at least one outer peripheral surface of the collar can contact the at least one inner peripheral surface of the washer.

BRIEF DESCRIPTION OF THE DRAWINGS

The disclosed fastening apparatus can be better understood with reference to the following drawings. The components in the drawings are not necessarily to scale.

DETAILED DESCRIPTION

Described in the following are fastening apparatuses that can be used to fasten components together, such as a flange and a housing. The fastening apparatuses include locking features that prevent a threaded fastening element from rotating once the threaded fastening element has been used to secure the components together. However, unlike fastening apparatuses of the prior art, the threaded fastening element can be easily removed from the threaded hole when necessary without damaging the component in which the fastening element is received.

In the following, various embodiments of fastening elements are disclosed. Although specific embodiments are presented, those embodiments are mere example implementations of the disclosed fastening elements and it is noted that other embodiments are possible. All such embodiments are intended to fall within the scope of this disclosure.

Figure 1:
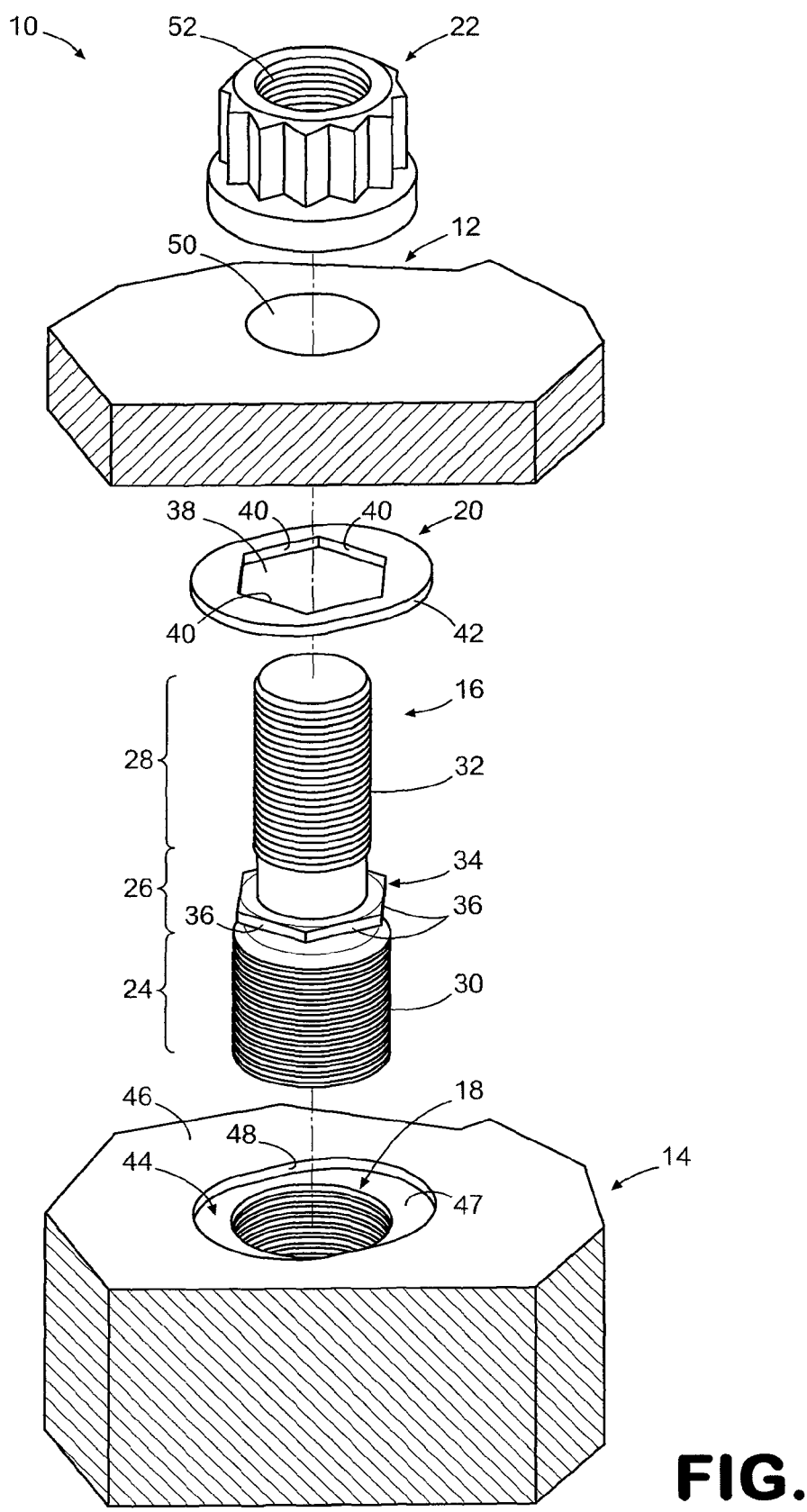
FIG. 1 is an exploded side view of a first embodiment of fastening apparatus and components that the fastening elements can fasten together.

Turning to the figures, in which like numerals identify corresponding components, FIG. 1 illustrates a first embodiment of fastening elements 10 that can be used to fasten components together. In the embodiment of FIG. 1, the exemplary components to be fastened together comprise a flange 12 that is to be fastened to a housing 14. The fastening elements 10 include a threaded stud 16 that can be received by a threaded hole 18 formed in the housing 14, and a locking washer 20 that is used to prevent rotation of the stud once placed in a desired position within the hole. In addition, the fastening elements 10 include a threaded nut 22, such as a locking nut.

In the embodiment of FIG. 1, the threaded stud 16 comprises a first or bottom portion 24, a second or middle portion 26 (or "shank"), and a third or top portion 28 provided along the length of the stud. By way of example, the first, second, and third portions 24-28 are unitarily formed from a single piece of material, such as steel. Both the first and third portions 24, 28 comprise threads 30 and 32 that enable fastening. Specifically, the threads 30 of the first portion 24 are adapted to mesh with threads of the threaded hole 18 of the housing 14 and the threads 32 of the third portion 28 are adapted to mesh with threads of the threaded nut 22. In the embodiment of FIG. 1, the threads 30 of the first portion 24 are relatively coarse and the threads 32 of the third portion 28 are relatively fine; however, other thread counts and thread orientations are contemplated.

Unlike the first and third portions 24, 28, the second portion 26 of the threaded stud 16 comprises no threads. However, the second portion 26 comprises a locking collar 34 that, as described below, can mate with surfaces of the locking washer 20. In some embodiments, the collar 34 is a hexagonal collar that comprises a plurality of planar outer peripheral surfaces 36.

The locking washer 20 is formed from a relatively thin piece of material, such as steel, and comprises an inner opening 38 that is defined by one or more planar inner peripheral surfaces 40. The opening 38 is adapted to receive the locking collar 34 of the threaded stud 16 with relatively close tolerance and, therefore, the inner peripheral surfaces 40 are adapted to contact the outer peripheral surfaces 36 of the collar. The locking washer 20 has a non-circular outer shape that is defined by a non-circular outer peripheral surface 42. In the embodiment of FIG. 1, the outer peripheral surface 42 forms a substantially oval shape. More particularly, the outer peripheral surface 42 forms a "racetrack" shape which is rectangular slot with full rounded ends such that the locking washer 20 comprises a relatively long axis and a relatively short axis (when viewed from above or below).

As is further illustrated in FIG. 1, the housing 14 comprises a locking recess 44 that is formed around or adjacent the threaded opening 18. The recess 44 is adapted to receive the locking washer 20 in its entirety such that, when the washer is disposed within the recess, substantially no portion of the washer extends beyond an outer surface 46 of the housing 14. Therefore, the recess 44 has a depth that is at least as large as the thickness of the washer 20.

The recess 44 is defined by a planar base 47 and an inner peripheral surface 48 that defines its shape. The recess 44 is adapted to receive the locking washer 20 with relatively close tolerance and, therefore, the recess has a shape that is similar to the shape of the washer and the inner peripheral surface 48 is adapted to contact the outer peripheral surface 42 of the washer to provide positive engagement. In embodiments in which the washer 20 has a substantially oval or racetrack shape, the recess 44 can also have a substantially oval or racetrack shape.

Figure 2:
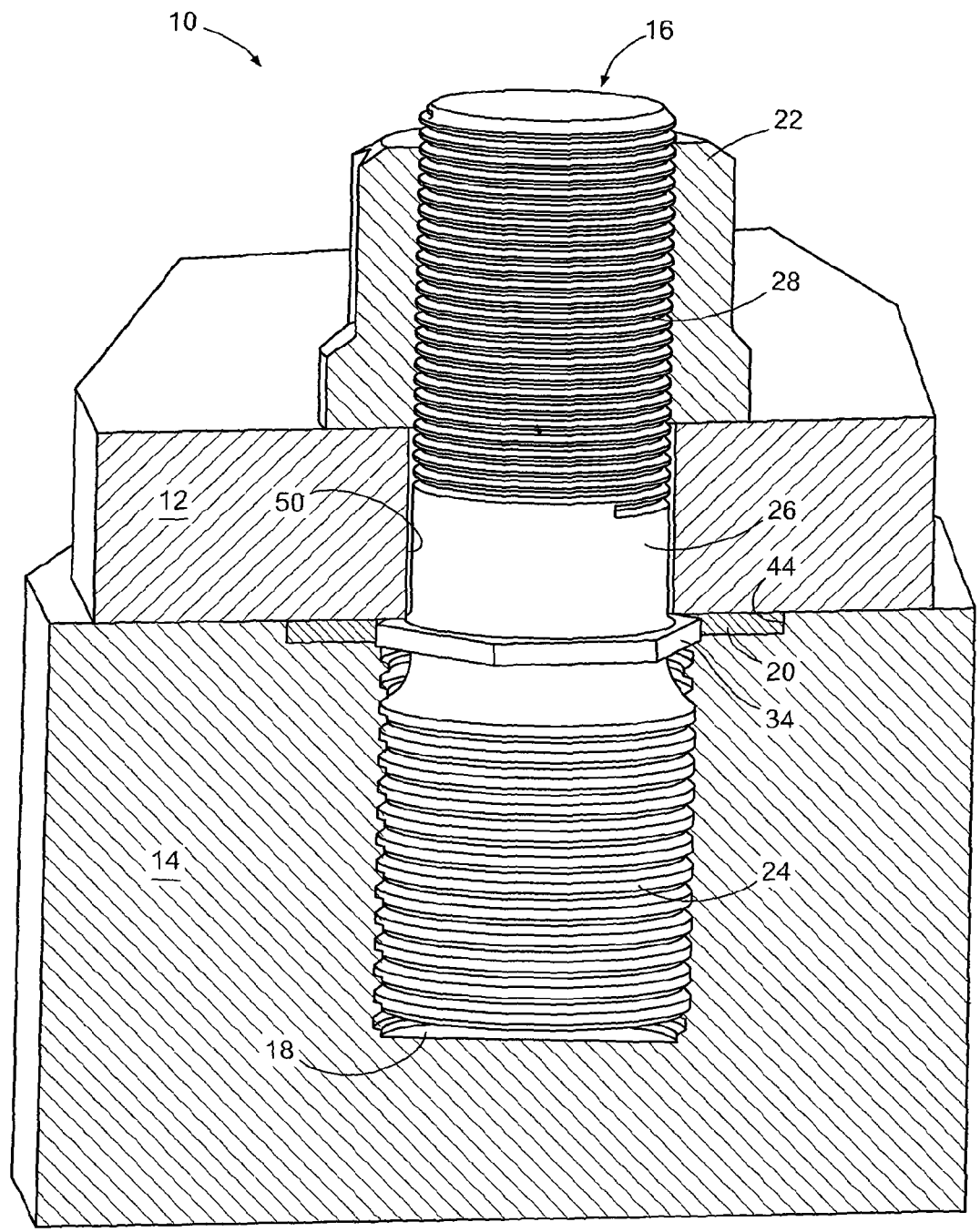
FIG. 2 is a cross-sectional side view of the fastening apparatus and components of FIG. 1, with the fastening elements shown fastening the components together.

As is also shown in FIG. 2, the flange 12 includes an opening 50 that is adapted to receive the threaded stud 16 and, more particularly, the second and third portions 26, 28 of the stud. In addition, the threaded nut 22 includes an opening 52 that is adapted to receive the stud 16 and, more particularly, the third portion 28 of the stud.

FIG. 2 illustrates the fastening elements 10 in use in securing the flange 12 to the housing 14. As indicated in FIG. 2, the threaded stud 16 is threaded into the threaded hole 18 of the housing 14 such that the threads of the first portion 24 of the stud mesh with the threads of the hole. When the stud 16 is substantially fully threaded into the hole 18, the locking collar 34 is positioned within the housing recess 44. The locking washer 20 is also positioned within the housing recess 44 with the collar 34 of the stud 16 received within the opening 38 of the washer. To enable the collar 34 to be so received, the stud 16 may need to be rotated within the hole 18 such that the outer peripheral surfaces 36 of the collar align with the inner peripheral surfaces 40 of the collar. In some embodiments, this can be achieved by fully threading the stud 16 into the hole 18 and then backing the stud out of the hole a fraction of a full turn such that the washer 20 can be accommodated.

Once the locking washer 20 has been positioned within the locking recess 44 around the locking collar 34, the threaded stud 16 will not be able to rotate relative to the threaded hole 18. Specifically, contact between the outer peripheral surface 42 of the washer 20 and the inner peripheral surface 48 of the recess 44 prevents the washer from rotating relative to the housing 14, and engagement between the outer peripheral surfaces 36 of the collar 34 and the inner peripheral surfaces 40 of the washer prevents the stud 16 from rotating relative to the washer (see FIG. 1).

The flange 12 is placed in contact with the housing 14 with the flange opening 50 receiving the threaded stud 16. In such an orientation, part of the third portion 28 of the stud 16 will extend beyond the outer surface of the flange 12 and therefore can receive the threaded nut 22. Once the nut 22 has been threaded onto the stud 16 and placed in firm contact with the flange 12, the flange will be secured to the housing 14. Notably, the presence of the flange 12 prevents the locking washer 20 from leaving the housing recess 44.

Figure 3:
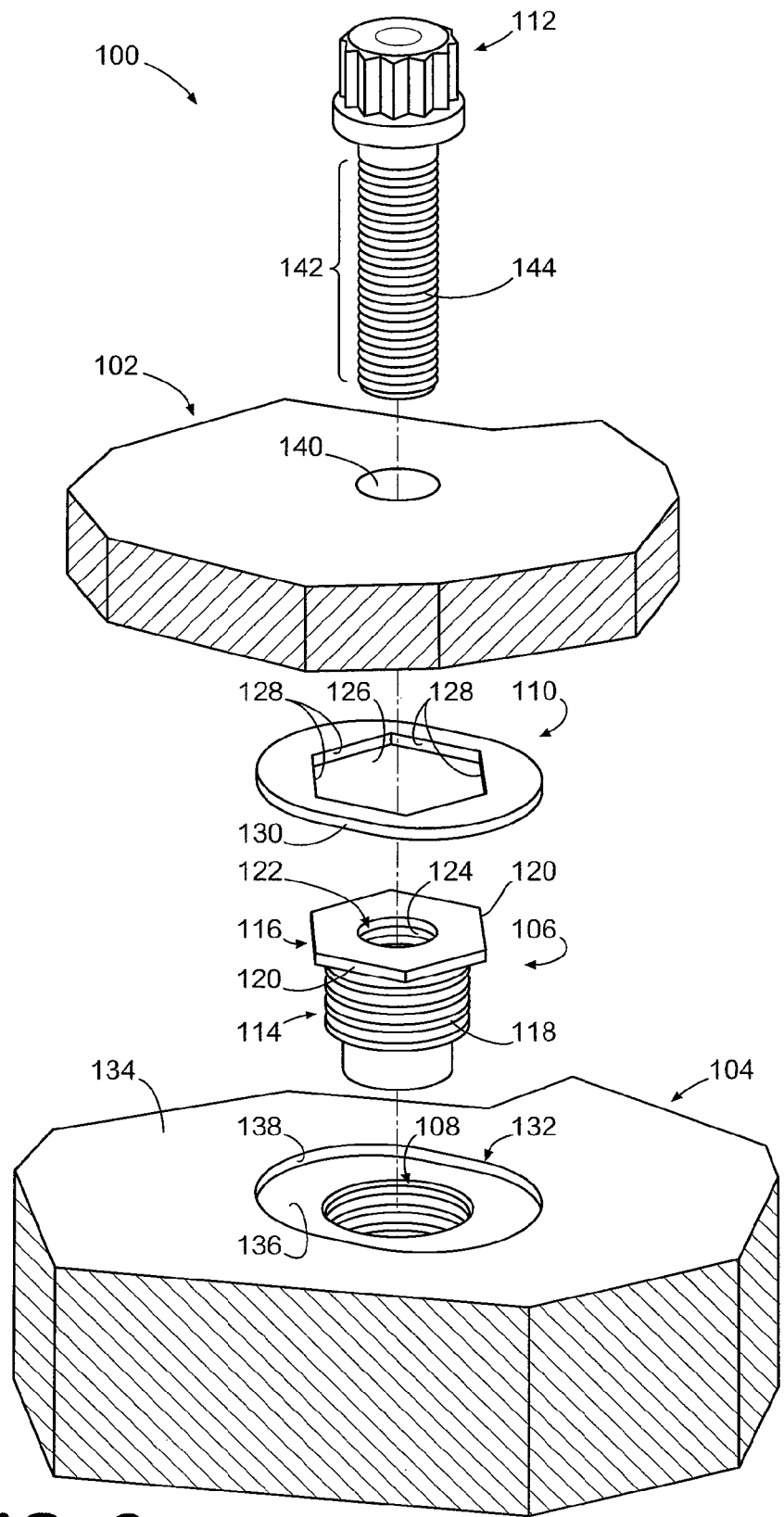
FIG. 3 is an exploded side view of a second embodiment of fastening apparatus and components that the fastening elements can fasten together.

FIG. 3 illustrates a second embodiment of fastening elements 100 that can be used to fasten components together. Like the embodiment of FIG. 1, the exemplary components to be fastened together in FIG. 3 comprise a flange 102 that is to be fastened to a housing 104. The fastening elements 100 include a threaded insert 106 that can be received by a threaded hole 108 formed in the housing 104, and a locking washer 110 that is used to prevent rotation of the insert once placed in a desired position within the hole. In addition, the fastening elements 100 include a threaded bolt 112.

In the embodiment of FIG. 3, the threaded insert 16 is unitarily formed from a single piece of mater, such as steel, and comprises a threaded portion 114 and a locking collar 116. The threaded portion 114 comprises threads 118 that are adapted to mesh with threads of the threaded hole 108 of the housing. The locking collar 116 is positioned at an end of the insert 106 and comprises a plurality of planar outer peripheral surfaces 120 that, as described below, can mate with surfaces of the locking washer 110. In addition, the insert 106 comprises a threaded hole 122 that includes threads 124 that are adapted to mesh with threads of the threaded bolt 112.

Like the locking washer 20 of FIG. 1, the locking washer 110 is formed from a relatively thin piece of material, such as steel, and comprises an inner opening 126 that is defined by one or more planar inner peripheral surfaces 128. The opening 126 is adapted to receive the locking collar 116 of the threaded insert 106 with relatively close tolerance and, therefore, the inner peripheral surfaces 128 are adapted to engage the outer peripheral surfaces 120 of the collar. The locking washer 110 has a non-circular outer shape that is defined by a non-circular outer peripheral surface 130. In the embodiment of FIG. 3, the outer peripheral surface 130 forms a substantially oval or racetrack shape such that the locking washer 110 comprises a relatively long axis and a relatively short axis (when viewed from above or below).

As is further illustrated in FIG. 3, the housing 104 comprises a locking recess 132 that is formed around or adjacent the threaded opening 108. The recess 132 is adapted to receive the locking washer 110 in it entirety such that, when the washer is disposed within the recess, substantially no portion of the washer extends beyond an outer surface 134 of the housing 104. Therefore, the recess 132 has a depth that is at least as large as the thickness of the washer 110.

The recess 132 is defined by a planar base 136 and an inner peripheral surface 138 that defines its shape. The recess 132 is adapted to receive the locking washer 110 with relatively close tolerance and, therefore, the recess has a shape that is similar to the shape of the washer and the inner peripheral surface 138 is adapted to contact the outer peripheral surface 130 of the washer to provide positive engagement. In embodiments in which the washer 110 has a substantially oval or racetrack shape, the recess 132 can also have a substantially or racetrack oval shape.

As is also shown in FIG. 3, the flange 102 includes an opening 140 that is adapted to receive the threaded bolt 112. The bolt 112 includes a threaded portion 142 that comprises threads 144 that mesh with the threads 124 of the threaded insert 106.

Figure 4:
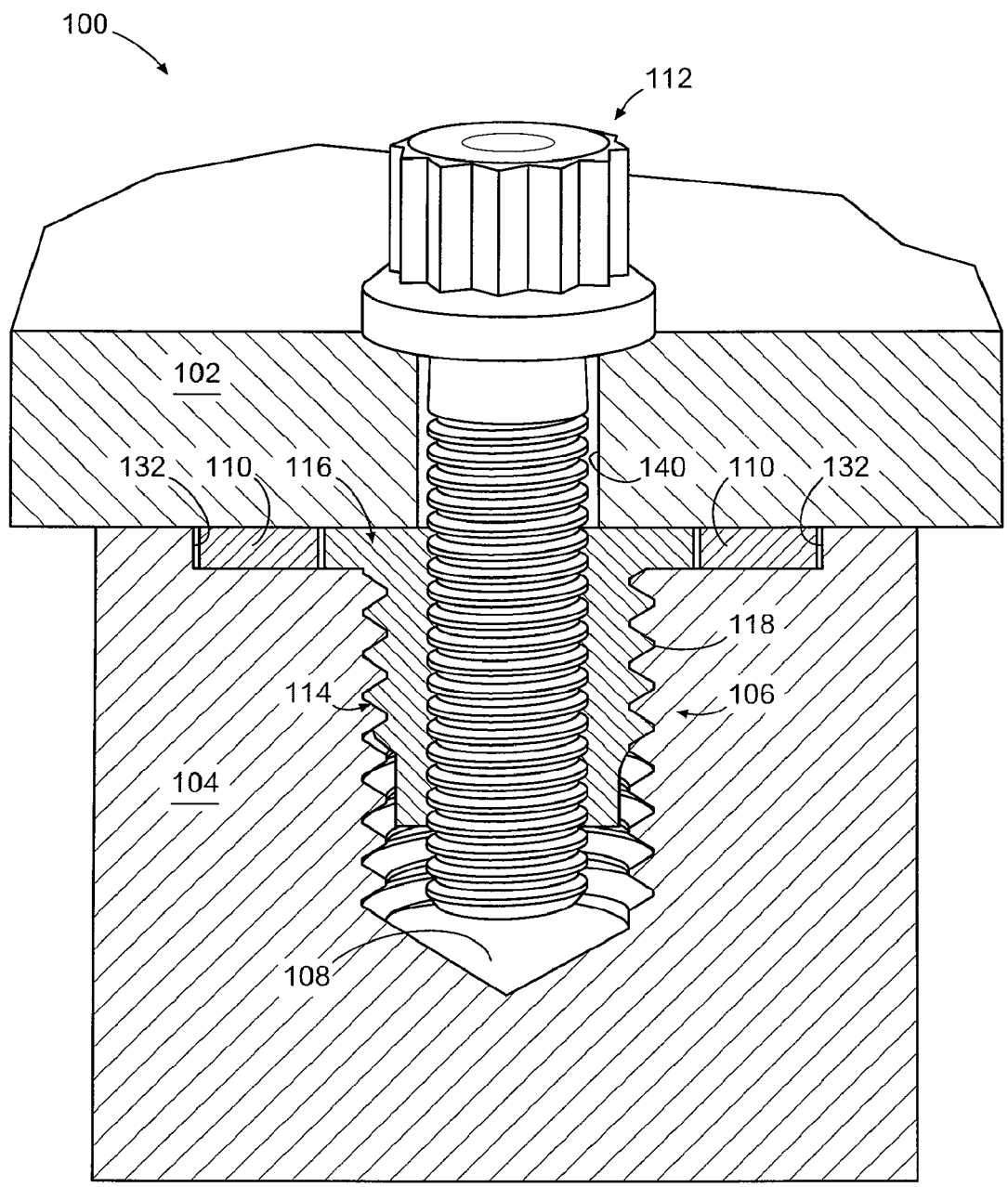
FIG. 4 is a cross-sectional side view of the fastening apparatus and components of FIG. 3, with the fastening elements shown fastening the components together.

FIG. 4 illustrates the fastening elements 100 in use in securing the flange 102 to the housing 104. As indicated in FIG. 4, the threaded insert 106 is threaded into the threaded hole 108 of the housing 104 such that the threads 118 mesh with the threads of the hole. When the insert 106 is substantially fully threaded into the hole 108, the locking collar 116 is positioned within the housing recess 132. The locking washer 110 is also positioned within the housing recess 132 with the collar 116 of the insert 106 received within the opening 126 of the washer. To enable the collar 116 to be so received, the insert 106 may need to be rotated within the hole 108 such that the outer peripheral surfaces 120 of the collar align with the inner peripheral surfaces 128 of the collar. In some embodiments, this can be achieved by fully threading the insert 106 into the hole 108 and then backing the insert out of the hole a fraction of a full turn such that the washer 110 can be accommodated.

Once the locking washer 110 has been positioned within the locking recess 132 around the locking collar 116, the threaded insert 106 will not be able to rotate relative to the threaded hole 108. Specifically, contact between the outer peripheral surface 130 of the washer 110 and the inner peripheral surface 138 of the recess 132 prevents the washer from rotating relative to the housing 104, and contact between the outer peripheral surfaces 120 of the collar 116 and the inner peripheral surfaces 128 of the washer prevents the insert 106 from rotating relative to the washer (see FIG. 3).

The flange 102 is placed in contact with the housing 104 with the flange opening 140 receiving the threaded bolt 112. Once the bolt 112 has been threaded onto the insert 106 and placed in firm contact with the flange 102, the flange will be secured to the housing 104. Notably, the presence of the flange 102 prevents the locking washer 110 from leaving the housing recess 132.

With the embodiments disclosed above, a threaded fastening element, such as a threaded stud or a threaded insert, can be removed when desired without damaging a component to which the fastening element is attached, such as an expensive housing. Specifically, the nut or bolt used to fasten components together can be removed and the locking washer simply withdrawn from its recess to enable the threaded fastening element to be removed and replaced, if necessary.

In the foregoing, locking washers have been described as being held in place within a recess by being trapped between fastened components. Notably, however, further retaining means can be used to retain the locking washer within its recess, if desired. In some embodiments, the locking washer can be glued or welded in place. In other embodiments, the locking washer can be staked in place, for example by deforming the edges of the recess so as to fix the washer in place. In still other embodiments, the locking washer can be placed within the recess with an interference fit.

The invention claimed is:

1. A fastening apparatus comprising:
   a threaded fastening element adapted to be threaded into a component hole provided in a first component, the threaded fastening element including a locking collar that is defined by a non-circular outer peripheral surface; and
   a locking washer adapted to fit within a recess formed in the component to limit rotation of the threaded fastening element once the element is threaded into the component hole, the washer including an inner opening defined by at least one inner peripheral surface and a non-circular outer shape defined by a smooth, continuous outer peripheral surface, the inner opening being adapted to receive the locking collar such that the non-circular outer peripheral surface of the collar can contact the at least one inner peripheral surface of the washer.

2. The apparatus of claim 1, wherein the threaded fastening element comprises a threaded stud.

3. The apparatus of claim 2, wherein the threaded stud comprises a first threaded portion that engages threads in the component hole and a second threaded portion that is exposed when the stud is threaded into the hole and wherein the locking collar is positioned between the first and second threaded portions.

4. The apparatus of claim 1, wherein the threaded fastening element comprises a threaded insert comprising outer threads adapted to engage threads of the component hole and a threaded hole that is adapted to receive a threaded bolt.

5. The apparatus of claim 1, wherein the locking collar forms a hexagon defined by a plurality of planar outer peripheral surfaces.

6. The apparatus of claim 1, wherein the locking washer has a substantially racetrack outer shape.

7. The apparatus of claim 1, wherein the inner opening of the locking washer forms a hexagon defined by multiple planar inner peripheral surfaces.

8. A fastening apparatus comprising:
   a threaded stud adapted to be threaded into a component hole provided in a component, the stud including a first threaded portion adapted to thread into the component hole, a second threaded portion that is exposed when the stud is threaded into the component hole, and a locking collar adapted to limit rotation of the stud relative to the component, the collar being defined by a non-circular outer peripheral surfaces; and
   a locking washer adapted to fit within a recess formed in the component, the washer including an inner opening defined by inner peripheral surfaces and a non-circular outer shape defined by a smooth, continuous outer peripheral surface, the inner opening being adapted to receive the locking collar such that the non-circular outer peripheral surfaces of the collar can contact the inner peripheral surfaces of the washer.

9. The apparatus of claim 8, wherein the locking washer has a substantially racetrack outer shape.

10. A fastening apparatus comprising:
    a threaded insert adapted to be threaded into a component hole provided in a component, the insert including a threaded portion adapted to thread into the component hole, a threaded opening adapted to receive a threaded bolt, and a locking collar adapted to limit rotation of the insert relative to the component, the collar being defined by a non-circular outer peripheral surfaces; and
    a locking washer adapted to fit within a recess formed in the component, the locking washer including an inner opening defined by inner peripheral surfaces and a non-circular outer shape defined by a smooth, continuous outer peripheral surface, the recess larger than the non-circular outer shape, the inner opening being adapted to receive the locking collar such that the non-circular outer peripheral surfaces of the collar can contact the inner peripheral surfaces of the washer.

11. The apparatus of claim 10, wherein the locking washer has a substantially racetrack outer shape.

12. The apparatus of claim 1, wherein the non-circular outer peripheral surface of the collar can contact the at least one inner peripheral surface of the washer to limit rotation of the threaded fastening element.

13. The apparatus of claim 10, wherein the outer peripheral surface is smooth.

14. The apparatus of claim 1, wherein the locking collar has a non-circular outer profile.

15. The apparatus of claim 1, wherein the locking collar is adapted to removably receive the locking washer.

16. The apparatus of claim 1, wherein interfaces between adjacent ones of the at least one inner surface are circumferentially aligned.

17. The apparatus of claim 1, wherein the continuous outer peripheral surface is smooth.

18. The apparatus of claim 1, wherein the outer peripheral surface is not serrated.

* * * * *